Feb. 24, 1959  K. W. THALHAMMER  2,874,625
ADJUSTABLE PNEUMATIC CONTROL DEVICE FOR CAMERA SHUTTERS
Filed April 26, 1956
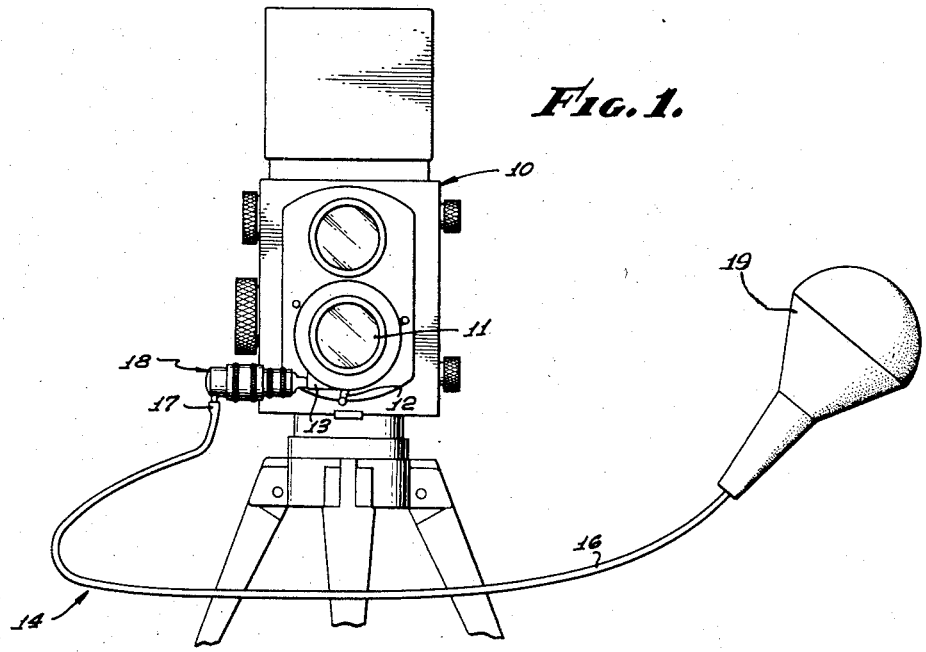
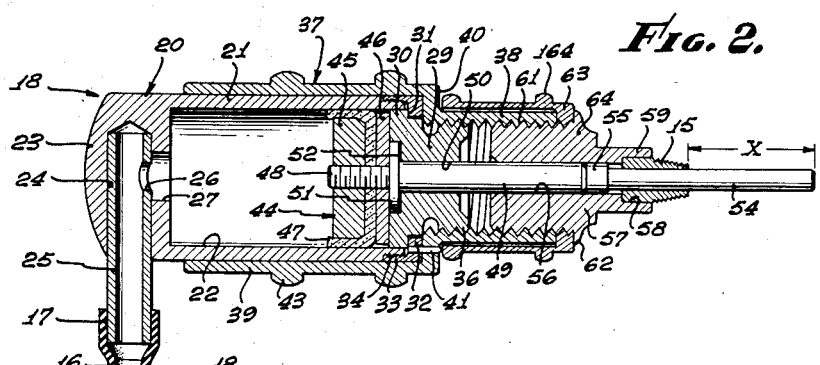
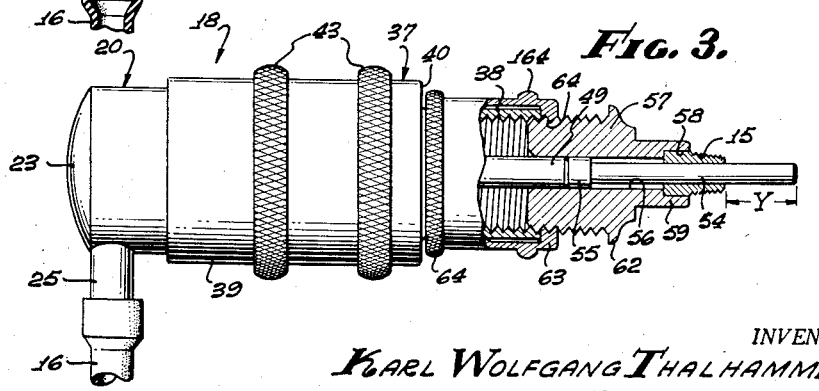
INVENTOR.
KARL WOLFGANG THALHAMMER
BY
ATTORNEY.

United States Patent Office 2,874,625
Patented Feb. 24, 1959

2,874,625

ADJUSTABLE PNEUMATIC CONTROL DEVICE FOR CAMERA SHUTTERS

Karl Wolfgang Thalhammer, Sunland, Calif.

Application April 26, 1956, Serial No. 580,843

3 Claims. (Cl. 95—54)

This invention relates to an adjustable pneumatic control device for actuating a shutter on a camera.

The stroke of shutter control levers on different cameras may vary so that when a pneumatic control device is used for actuating the camera shutter from a distance, the throw or distance of travel of the piston plunger of the control device must be correlated to the length of stroke of the shutter control lever so that the camera is not jarred or disturbed when the control device is actuated. Prior proposed pneumatic control devices have utilized piston plungers for actuating the shutter control lever in which the piston plunger moved a fixed preselected distance. Usually this fixed distance was selected for a particular type of camera or groups of cameras which had approximately the same stroke of shutter control lever. However, at the present time, there are many shutters for cameras which utilize different lengths of stroke on their shutter control levers and prior proposed pneumatic control devices for actuating such cameras are not adjustably adaptable to the various length of strokes of shutter control levers.

This invention contemplates a pneumatic control device which is readily adjustable to the stroke of a selected shutter control lever. The invention contemplates a particularly efficient pneumatic control device so that a camera may be actuated from relatively great distances.

It is therefore the primary object of this invention to disclose and provide a pneumatic control device for actuating a shutter on a camera which may be readily adjustable to the stroke of a camera shutter control lever.

An object of this invention is to provide a pneumatic control device which is simply and efficiently constructed and which provides a highly efficient pneumatic control device capable of actuating a camera shutter at great distances.

Another object of this invention is to disclose and provide a pneumatic control device which includes a composite plunger pin means or construction wherein a piston plunger is provided with a fixed throw and a free plunger pin is adjustably related to the fixed plunger pin so that the effective throw of the composite plunger pin means may be readily adjusted to a selected shutter control.

A further object of this invention is to disclose and provide such an adjustable pneumatic control device for actuating a camera wherein means are provided to selectively, releasably lock adjustment means so that a selected effective throw of the plunger pin means is provided.

Still another object of this invention is to disclose and provide a pneumatic control device which includes pneumatic cylinder means comprising an extension for mounting an adjustable plunger pin means.

A still further object of this invention is to disclose and provide a pneumatic control device for a shutter on a camera wherein a pneumatic cylinder means includes an extension for mounting an adjustable ported nut which slidably carries an auxiliary free plunger pin means for contact with a shutter control lever.

Generally speaking this invention contemplates an adjustable pneumatic control device for actuating a shutter on a camera which includes a pneumatic cylinder means provided with an extension for mounting a longitudinally adjustable nut therein. A composite plunger pin means is carried by the cylinder means and by the adjustable nut, said composite pin means comprising a piston plunger pin having a fixed throw and a free auxiliary shutter lever contacting pin slidably carried by the adjustable nut. The adjustable nut is movable axially of the composite pin construction and within the extension so as to vary the effective length of travel of the composite pin means. The adjustable nut is provided with means for connection to the camera and a locking sleeve or ring is carried by the extension in threaded engagement with the nut for locking the adjustable nut in selected position.

Other and allied objects and advantages of this invention will be readily apparent from the following description of the drawings.

In the drawings:

Fig. 1 is a front view of a camera and a pneumatic control device attached thereto and embodying this invention.

Fig. 2 is a fragmentary enlarged sectional view taken through the control device shown in Fig. 1, the view showing the control device adjusted for maximum throw of the composite pin means.

Fig. 3 is a fragmentary sectional view of the control device shown in Fig. 2 showing the control device adjusted for minimum throw of the composite pin means.

Camera 10 may be provided with shutter 11 of well known form and construction and which may be manually actuated by a shutter control lever 12. The shutter 11 is also provided with an attachment for actuating the shutter by pneumatic means as is well known in the art, such attachment being generally indicated at 13 and including an internally threaded port which leads to a portion of the actuating shutter control lever 12. Connected to the attachment 13 in well known manner is a pneumatic control device generally indicated at 14 embodying this invention, such connection including an externally threaded, tapered insert 15 carried by control device 14 and threaded into the corresponding internal, tapered threads in the attachment 13.

The pneumatic control device 14 of this invention comprises generally a pneumatic, rubber, resilient bulb 19 connected to one end, in any suitable manner, to a flexible, rubber tube 16 of any selected length. The other end of tube 16 is connected as at 17 to pneumatic control actuating means 18. The pneumatic bulb 19 and tube 16 are well known and do not form a part of this invention.

The pneumatic control-actuating means 18 is shown in detail in Fig. 2 and comprises a pneumatic cylinder means 20 providing a cylindrical wall 21 defining a cylinder chamber 22. The cylinder means 20 includes an end wall 23 of thickened section provided with a transversely extending bore 24 to receive a metal tube 25 which projects outwardly from bore 24 for connection to one end of tube 16 as at 17. The tube 25 is provided with a side port 26 which is aligned with an enlarged opening 27 in end wall 23 for communication between the chamber 22, tube 25, tube 16 and bulb 19.

The opposite end of cylindrical wall 21 may be closed by a removable cylinder head 29 provided with a radially, outwardly extending flange 30 received within chamber 22 and defining an outwardly facing shoulder 31. The shoulder 31 normally abuts a radially, inturned lip 32 provided on a cylinder head retaining ring 33 which may be threaded as at 34 to external threads on the cylinder wall 21. The retaining ring 33 limits outward displacement of the cylinder head 29.

The cylinder head 29 is provided also with an outwardly projecting, externally threaded portion 36 for mounting thereon an external cylindrical stepped sleeve member 37. The sleeve member 37 is provided with a forwardly extending, hollow, internally threaded extension 38, the threads of which engage the external threads on the cylinder head adjacent to the inner end of the extension. The extension 38 is of reduced diameter as compared to a main body portion 39 of the sleeve member 37, said body portion 39 being slidably, telescopically fitted over the cylinder wall 21. The body portion 39 and the extension 38 define a shoulder 40, the inner surface of which, in assembled position, abuts against the outwardly directed face of retaining ring 33. It will thus be apparent that the sleeve member 37, when threaded, as shown, to the cylinder head 29, serves to position the cylinder head 39 tightly against the lip 32 of the retaining ring.

Relative rotation between the retaining ring and the sleeve member 37 may be suitably prevented by a pin 41 extending through and fitted in aligned openings in the shoulder 40 and in the lip 32 of the sleeve member and retaining ring respectively.

The sleeve member 37 may be provided on its external surface with a pair of longitudinally spaced, knurled bands 43 to facilitate grasping of the actuating means 18.

Within chamber 22 may be provided a piston head 44 of any suitable construction. Piston head 44 may comprise a pair of spaced metal washers 45 and 46 carrying therebetween a suitable cup-shaped resilient yieldable piston head element 47 for providing a pneumatic seal against internal surfaces of the chamber 22. The piston head 44 may be threadedly carried on the threaded end 48 of a piston plunger pin 49 forming a part of a composite plunger pin means. The pin 49 extends through an axial port 50 in the cylinder head 29, and may carry a collar 51 receivable within a circular recess 52 provided in the inner end face of the cylinder head 29.

The composite plunger pin means includes, in addition to the piston pin 49, an axially aligned auxiliary free shutter contacting pin 54. The pin 54 is provided with an enlarged head 55 of approximately the same diameter as pin 49 and the head 55 is slidable within a bore 56 provided in an adjustment nut 57. The bore 56 also slidably receives the outer end portion of pin 49. Free pin 54 is also slidably extending through a bore in the insert 15 which may be fitted into an enlarged outwardly facing recess 58 provided in an external, polygonal-shaped end portion 59 of nut 57. The free pin 54 is limited in its outward movement by abutment of enlarged head 55 with the inner end face of the insert 15.

The adjustment nut 57 is provided with external threads for threadedly engaging at 61 the internal threads on the extension 38 of the sleeve member. The length of the threads on the extension 38 and on the adjustment nut 57 is sufficient so that the adjustment nut may be axially positioned a selected distance from the cylinder head 29 so as to adjust the overall effective throw of the composite plunger pin means. Overall effective throw of the pin means is measured from outer end of the insert member 15 to the outer end of auxiliary pin 54 in outermost position of the pin 54 while in abutting contact with the pin 49.

The adjustment nut 57 may be provided with a radially, outwardly extending flange 62 at the outer end of the threaded portion thereof for abutment in maximum throw position with a locking sleeve 63. The locking sleeve 63 is provided with a relatively short threaded portion 64 which threadedly engages the threads on the adjustment nut 57 outwardly of the extension 38. The locking sleeve 63 is sleeved over the extension 38 and may be provided on its external surface with a pair of knurled bands 64 to facilitate grasping of the locking sleeve.

Adjustment of the effective throw of the composite pin means is accomplished by selectively, adjustably threading the adjustment nut 57 with respect to the extension 38. In Fig. 2, maximum throw of the composite pin means is illustrated by the distance indicated by X. In this adjustment for maximum throw, it will be noted that the adjustment nut 57 is threaded into the extension 38 as far as possible. Thus, when the piston plunger pin 49 is actuated to move its normal fixed amount of outward travel, abutment of the end of the pin 49 against the head 55 of the free pin 54 will cause the free pin 54 to extend outwardly from the insert 15 the maximum distance X.

In Fig. 3, approximately minimum effective throw of the composite pin means is indicated by the distance Y. In this adjustment, it will be noted that the adjustment nut 57 is positioned so that the innermost threads on the adjustment nut are engaged with the outermost threads on the extension 38. The locking sleeve 63 is threaded tightly against the annular end face of extension 38 so as to lock the adjustment nut 57 in selected position. In this adjustment, it will be noted that the piston plunger pin 49 is outwardly positioned the same distance or throw as shown in Fig. 2. However, the free pin 54 now extends outwardly from the insert 15 a minimum distance Y. Since the tapered, external threads on the insert member 15 provide the connection to the camera shutter control means, it will be apparent that the effective throw Y of the composite pin means in minimum adjustment as shown in Fig. 3 will provide for actuation of the shutter control lever when the stroke of such lever is relatively short.

Operation of the pneumatic control device 14 is readily understood. Squeezing of the pneumatic bulb 19 compresses the air within the closed air system comprising the bulb, tube and pneumatic actuating means 18 so as to move the piston head 44 into abutment with the cylinder head 29. Such movement of the piston head causes longitudinal movement of the plunger pin 49 which contacts the enlarged head 55 of the free pin 54 to positively urge the free pin 54 outwardly of the adjustment nut 57. Upon release of pressure on the pneumatic bulb 19, the piston head will be withdrawn to the other end of the cylinder chamber 22, thus causing the plunger pin 49 to be likewise retracted in the adjustment nut 57 and head 29. Since pressure is no longer acting on the free pin 54, it is free to limitedly move in either direction but is not capable of exerting any force against a shutter control lever.

It will thus be readily apparent to those skilled in the art that an adjustable, pneumatic control device has been provided which may be readily utilized with shutter control devices for cameras having different lengths of strokes. Thus, the control device of this invention may be readily adjusted to a particular camera and the camera actuated from a distance without causing disturbance of the camera due to overtravel of actuating plunger pin means against a camera control lever.

It will be readily understood that various modifications and changes may be made in the composite pin means and the construction of the cylinder means and the means for mounting the composite pin means, all of which may come within the spirit of this invention, and all such changes in construction coming within the scope of the appended claims are embraced thereby.

I claim:

1. A pneumatic control device for a camera shutter comprising, in combination: a cylinder means provided with a chamber having an open end and an inlet port at the other end in communication with a closed system of actuating fluid; a removable cylinder head received within said open end for closure thereof and provided with external threads extending beyond said cylinder means and with a throughbore; a retaining ring for said cylinder means and said cylinder head; a piston head movable within said chamber and having a plunger pin extending through said bore; an elongated sleeve member telescopically received over the cylinder means and provided with internal threads engaging the external threads on said cylinder head, said sleeve member extending beyond said head; means to hold said sleeve member and said cylinder means against relative rotation in assembly; an adjustment nut threadedly connected to the extension of said sleeve member and having means at one end for connection to a camera, an auxiliary floating plunger pin slidably carried by the adjustment nut in axial alignment with the piston plunger pin and adapted to be contacted thereby; and means for locking the adjustment nut in selected position.

2. A pneumatic control device for a camera shutter comprising, in combination: a cylinder means provided with a chamber having an open end and an inlet port at the other end in communication with a closed system of actuating fluid; a removable cylinder head received within said open end for closure thereof and provided with external threads extending beyond said cylinder means and with a throughbore; a retaining ring for said cylinder means and said cylinder head; a piston head movable within said chamber and having a plunger pin extending through said bore; an elongated sleeve member telescopically received over the cylinder means and provided with internal threads engaging the external threads on said cylinder head, said sleeve member extending beyond said head; an adjustment nut threadedly connected to the extension of said sleeve member and having means at one end for connection to a camera, an auxiliary floating plunger pin slidably carried by the adjustment nut in axial alignment with the piston plunger pin and adapted to be contacted thereby; and means for locking the adjustment nut in selected position.

3. A pneumatic control device for a camera shutter comprising in combination: a cylinder means including a chamber having an inlet port in communication with a closed system of actuating fluid; a cylinder head defining one end of said chamber and provided with an extension beyond said cylinder means; a sleeve member adapted to receive said cylinder means and having an extension connected to the extension on said cylinder head, said sleeve member extension projecting beyond said cylinder head; an adjustment nut carried by said sleeve member extension for relative longitudinal positioning with respect to said chamber; a piston head movable in said chamber and provided with a piston stem; said cylinder head and said adjustment nut being provided with axially aligned bores for receiving said piston stem; and a free floating plunger pin carried by said adjustment nut and adapted to be operatively contacted by said piston stem; said piston head and piston stem being retractive upon relief of pressure of said actuating fluid.

References Cited in the file of this patent

UNITED STATES PATENTS

| | | |
|---|---|---|
| 1,997,315 | Schwartz | Apr. 9, 1935 |
| 2,124,368 | Eisenhand | July 19, 1938 |
| 2,321,945 | Schwartz et al. | June 15, 1943 |
| 2,552,018 | Schwartz et al. | May 8, 1951 |
| 2,615,379 | Groff | Oct. 28, 1952 |